Jan. 13, 1953 K. A. KOCH 2,625,498
METHOD OF MAKING PLASTIC REINFORCED RODS AND BARS
Filed July 29, 1950
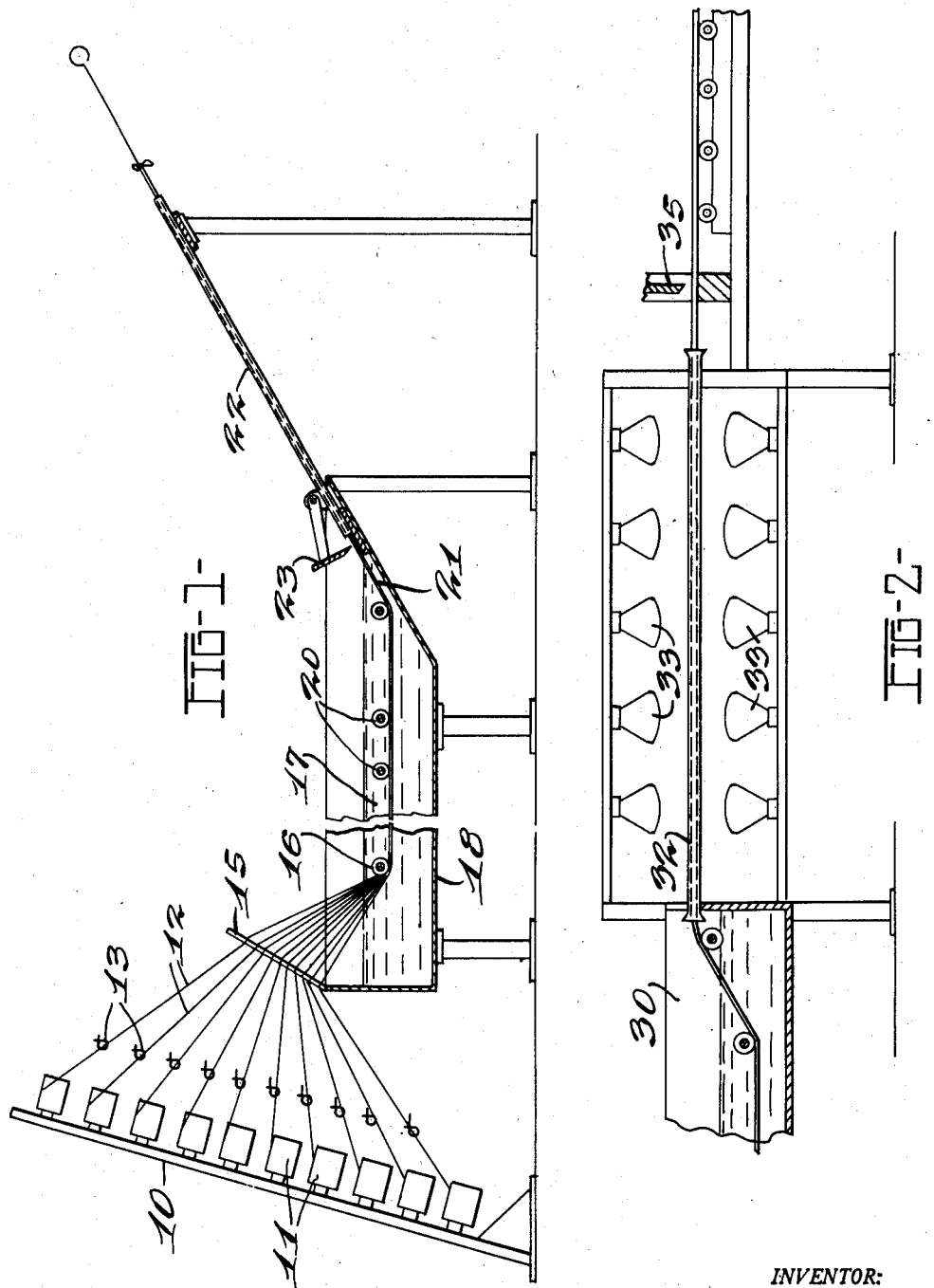
INVENTOR:
KING A. KOCH.
BY
Staelin & Overman
ATTYS.

Patented Jan. 13, 1953

2,625,498

UNITED STATES PATENT OFFICE 2,625,498

METHOD OF MAKING PLASTIC REINFORCED RODS AND BARS

King A. Koch, Evanston, Ill., assignor to Owens-Corning Fiberglas Corporation, a corporation of Delaware Application July 29, 1950, Serial No. 176,559

6 Claims. (Cl. 154—91)

The present invention relates to reinforced plastic and more particularly to plastic rod and bar stock reinforced with glass fibers for use as fishing rod blanks, shafts for arrows, electrical insulation, and the like.

Glass fibers are widely used as a reinforcement for plastics such as synthetic resins of numerous types and synthetic and natural rubber and the like because of the high strength they impart to products made therefrom. Glass fibers are inorganic and are not affected by moisture, are dimensionally stable and the products made therefrom are not subject to warping. In products subject to great flexure, glass fiber reinforced products will not take a "set" or otherwise become permanently deformed. It is a primary object of the present invention to provide a novel method of poducing rods and bars of a plastic material reinforced with glass fibers.

Another object of the invention is to produce a reinforced plastic material in the form of rods and bars in a simple, rapid and economical manner.

It is still another object of the invention to produce glass fiber reinforced rods and bars of substantially continuous length in which the reinforcing fibers extend throughout the length thereof.

Other objects and advantages of the invention will be come apparent during the course of the following description when considered in connection with the accompanying drawing, in which:

Figure 1 is a diagrammatic side elevational view of one means of practicing the invention; and Figure 2 is a diagrammatic view of a modified form of the invention shown in Figure 1.

It is a prerequisite in the production of the present type of material to obtain a high concentration of glass fibers in order to realize the highest strength characteristics in the final product. Such a concentration of fibrous material is obtained by employing glass fibers in the form of strands or yarns of continuous type filaments. The strands may comprise 100 to 200 or more filaments and may be either twisted or untwisted while the yarns may consist of two or more strands twisted or plied together. This strand material is available commercially in continuous lengths and exhibits very high tensile strength. Also, by employing such material, the strands extend continuously throughout the length of the product and provide substantially greater strength over strands formed of staple length fibers.

The present invention comprises generally gathering a multiplicity of strands of glass fibers into a bundle, impregnating the bundle with synthetic resin and molding the bundle into the required shape. It is usually desirable to provide a high percentage of glass fibers in proportion to the volume of resin present and this proportion may well amount to from 60% to 75% of glass by volume of resin. One means for obtaining the high percentage of glass is illustrated in Figure 1 wherein a creel 10 or rack is provided for supporting a plurality of spools or reels 11 of strand material. The spools 11 may be conveniently supported so that the strand 12 can be withdrawn therefrom with the greatest facility. Tensioning means 13 may be provided to provide a uniform tension on the strands as they are drawn from the spool. The spools 11 may be what is known in the textile trade as "multiple wound," that is, a plurality of strands of 8 or 10 "ends" are wound into a package or spool as one strand so that the spool contains a "cable" consisting of any number of strands desired.

In the present instance, it has been found that bundles of 8 strands may be suitably handled in the present apparatus. The strands are led from the spools and threaded through a guide plate 15 which may be any suitable shape or construction to provide a substantially uniform spacing of the strand material. As the strands 12 are drawn from the plate 15 they are passed beneath the guide member 16 submerged within a bath of fluid resin 17 contained within a trough or tank 18. The tank 18 may be of any suitable length and capacity to assure complete impregnation of the strands by the resin, a series of guides or rollers 20 may be provided along the length of the tank to regulate the tension and form the strands into a single large bundle or cable 21.

At the start of the operation the strands are drawn through the plate 15 and the ends gathered together and tied into a bundle. The strands forming the cable or bundle 21 are then drawn into a tubular mold 22 suitably positioned at the end of the tank 18. The mold or tube may be of suitable size and shape to produce a rod or bar of the desired dimension. For example, a mold $\frac{7}{16}''$ in diameter may require as many as 900 to 1000 strands in order to obtain the desired glass to resin ratio. When the bundle of resin coated strands has been drawn into the tube the desired length, the bundle may be severed adjacent the lower end of the tube by means of a knife 23. The severed free ends of the bundle are again suitably tied together in readiness to again be drawn through a mold. After the strands are severed at the end of the mold the bundle of strands is drawn upwardly a distance to within approximately one inch of the upper end of the tube and the lower end of the tube closed by means of a suitable stopper not shown herein to prevent the resin from draining from the tube. The filled tube or mold is then removed and replaced with an empty one, the loaded mold being then placed in a vertical position within a suitable curing oven until the resin has completely set or cured, after which the rod may be ejected from the mold in any convenient manner. The apparatus thus far described is adapted only for a single mold operation. However, a plurality of molds may be filled simultaneously by duplicating the apparatus.

Figure 2 of the drawing illustrates a modification of the invention by means of which rod or bar stock may be continuously produced. In this form the invention comprises a tank or other receptacle for containing the bath of the impregnating resin and the strands as they are drawn therethrough may be suitably fed into a tubular mold or die 32. As the bundle of impregnated strands is drawn through the die the resin may be cured by means of suitable batteries of infra-red heat lamps 33 arranged along the length of the tube. Thus, the material is drawn from the end of the tube in a completely cured state and may be severed into suitable lengths by means of a knife 35. In this form of the invention also, the die or tube 32 may be duplicated any number of times to produce continuously a plurality of reinforced plastic rods.

The types of resin found suitable for producing the present material are thermosetting resins of the low pressure curing type. That is, resins which require only a low degree of heat, for instance, 150° F. to 250° F. and require little or no pressure during the curing cycle. Such resins are long chain polymerizing resins and may be selected from the groups comprising polyester resins, phenolic base resins, polystyrene and polymers and copolymers of the above resins. Combinations of the above resins may also be employed.

Modifications may be resorted to within the spirit of the invention and the scope of the appended claims.

I claim:

1. The method of producing rods and bars of reinforced plastic which comprises withdrawing a multiplicity of strands of untwisted glass fibers from a source thereof, orienting said strands to form a loose cable thereof, uniting the ends of the strands, drawing the cabled strands through a bath of a low pressure thermosetting resin to coat the individual strands, feeding the coated cable into a mold, severing the strands adjacent the end of the mold, closing the end of the mold to prevent the escape of resin therefrom, curing the resin while the mold is supported in a vertical position, and removing the cured article from the mold.

2. The method of producing rods and bars of reinforced plastic which comprises withdrawing a multiplicity of strands of untwisted glass fibers from a source thereof, gathering the strands into a bundle, uniting the ends of the strands, drawing the bundle of strands through a bath of a low pressure thermosetting resin to coat the individual strands, feeding the coated strands into a mold, severing the strands adjacent the end of the mold, closing the end of the mold to prevent the escape of resin therefrom, curing the resin while the mold is supported in a vertical position, and removing the cured article from the mold.

3. The method of producing rods and bars of reinforced plastic which comprises withdrawing a multiplicity of strands of glass fibers from a source thereof, gathering the strands into a loose bundle, uniting the ends of the strands, drawing the bundle of strands through a bath of impregnating low pressure thermosetting resin to coat the individual strands, drawing the coated strands into a mold, severing the strands adjacent the end of the mold when the mold is filled, curing the resin, and removing the cured article from the mold.

4. The method of producing rods and bars of reinforced plastic which comprises withdrawing a multiplicity of strands of untwisted glass fibers from a source thereof, orienting said strands to form a loose cable thereof, uniting the ends of the strands, drawing the cabled strands through a bath of a low pressure thermosetting resin to coat the individual strands, feeding the coated cable into a mold, the glass and resin being present in a ratio of about 60 to 75% glass by volume of resin, severing the strands adjacent the end of the mold, closing the end of the mold to prevent the escape of resin therefrom, curing the resin while the mold is supported in a vertical position, and removing the cured article from the mold.

5. The method of producing rods and bars of reinforced plastic which comprises withdrawing a multiplicity of strands of untwisted glass fibers from a source thereof, gathering the strands into a loose bundle, uniting the ends of the strands, drawing the bundle of strands through a bath of impregnating low pressure thermosetting resin to coat the individual strands, feeding the coated bundle into a mold dimensioned to enable the glass and resin to be present in a ratio of about 60 to 75% glass by volume of resin, severing the strands adjacent the end of the mold when the mold is filled, heating the mold to cure the resin in the mold, and removing the cured article from the mold.

6. The method of producing reinforced plastics in the form of rods which comprise withdrawing a multiplicity of strands of glass fibers from a source thereof, gathering the strands into a bundle, drawing the strands through a bath of a low pressure thermosetting resin to coat the individual strands, drawing the coated strands into a mold, the glass and resin being present in a ratio of about 60 to 75% glass by volume of resin, severing the strands adjacent the end of the mold, closing the end of the mold, and curing the resin while the mold is supported in a vertical position.

KING A. KOCH.

REFERENCES CITED

The following references are of record in the file of this patent:

UNITED STATES PATENTS

| Number | Name | Date |
|---|---|---|
| 1,421,306 | Rawlings | June 27, 1922 |
| 2,055,776 | Saladino | Sept. 29, 1936 |
| 2,210,432 | Roesch | Aug. 6, 1940 |
| 2,419,328 | Watson et al. | Apr. 22, 1947 |

FOREIGN PATENTS

| Number | Country | Date |
|---|---|---|
| 627,255 | Great Britain | Aug. 4, 1949 |

OTHER REFERENCES

"The Chemistry of Commercial Plastics," Wakeman, page 498, Reinhold Publishing Corp., 330 W. 42nd St., N. Y. C., 1947.

Howald, "Modern Plastics," February 1946, pages 124 and 125.